Patented May 30, 1944

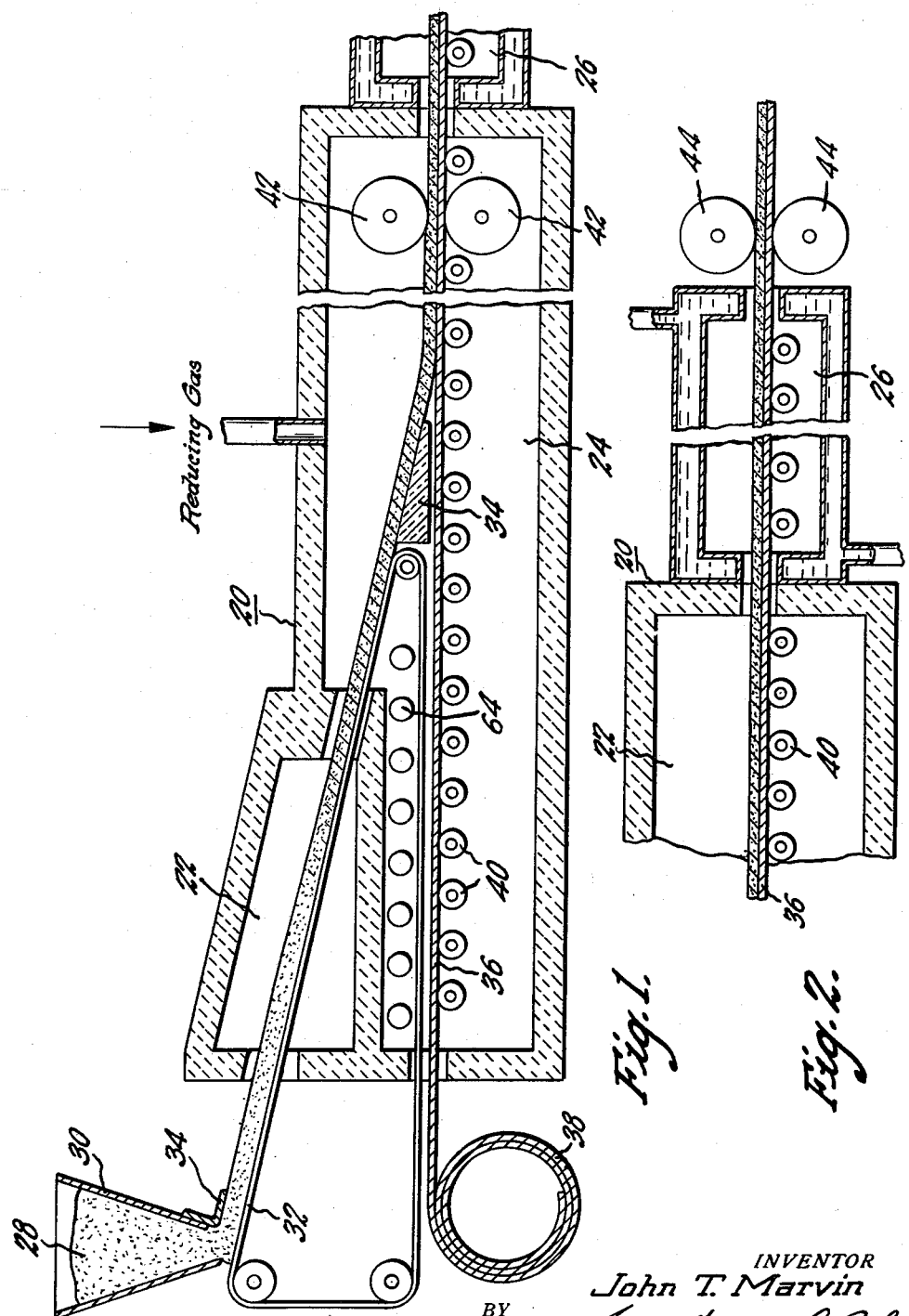

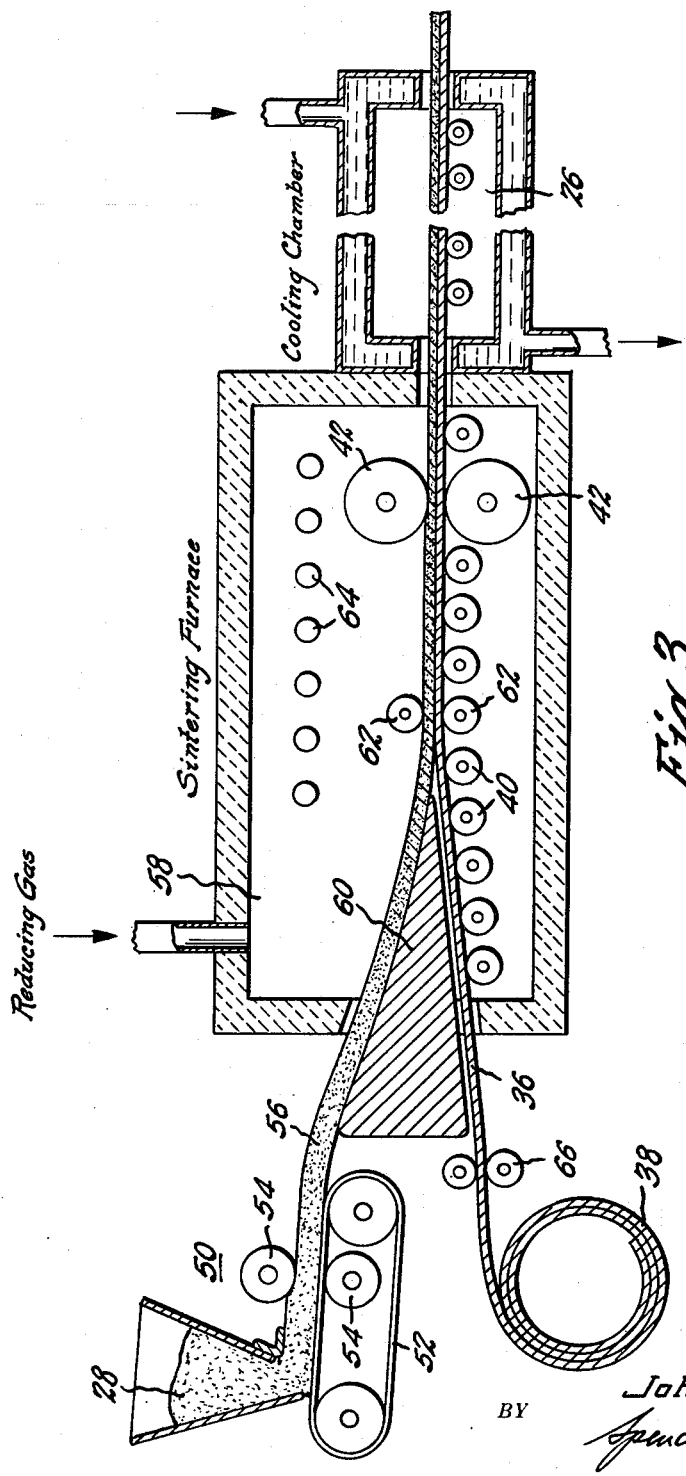

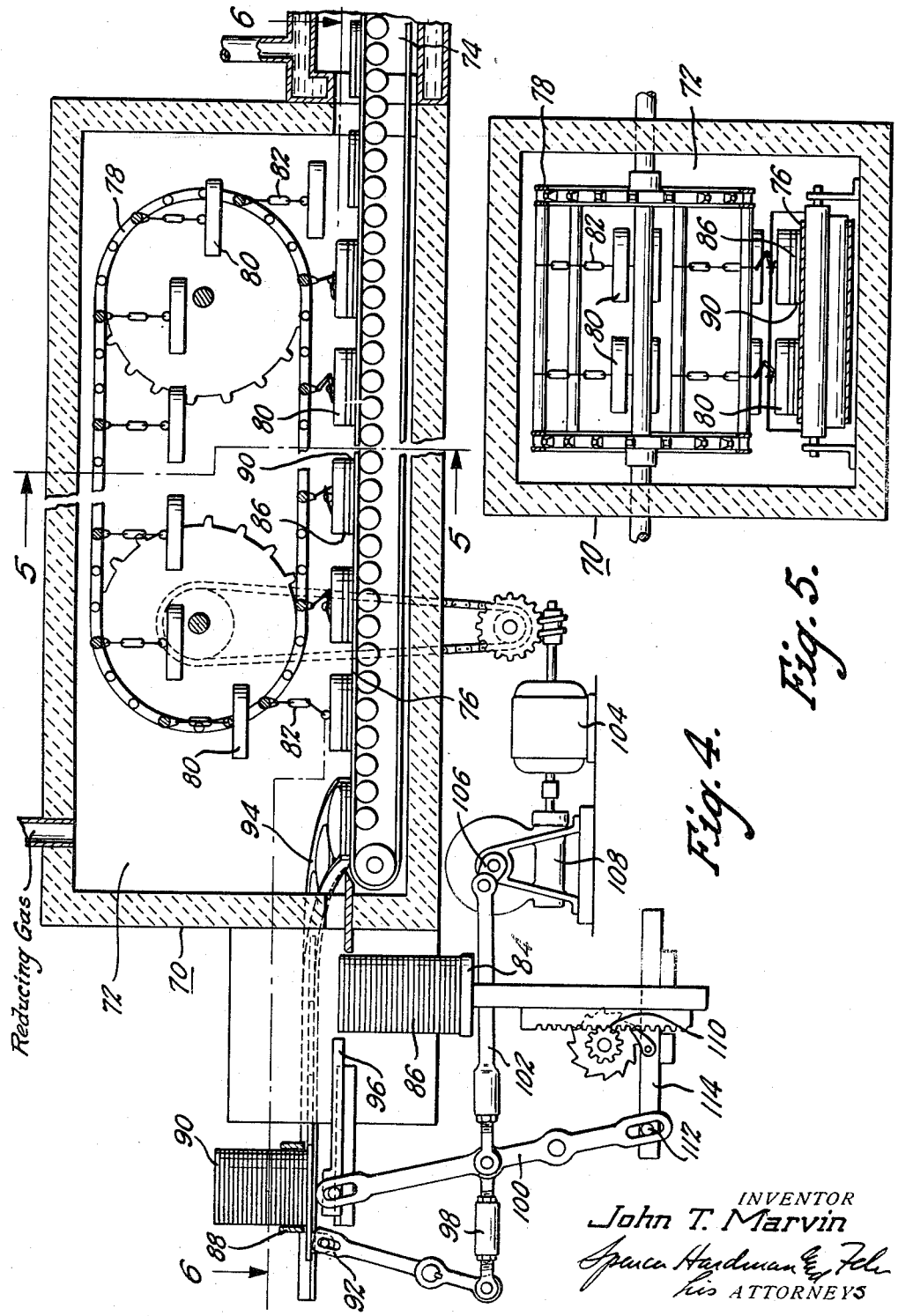

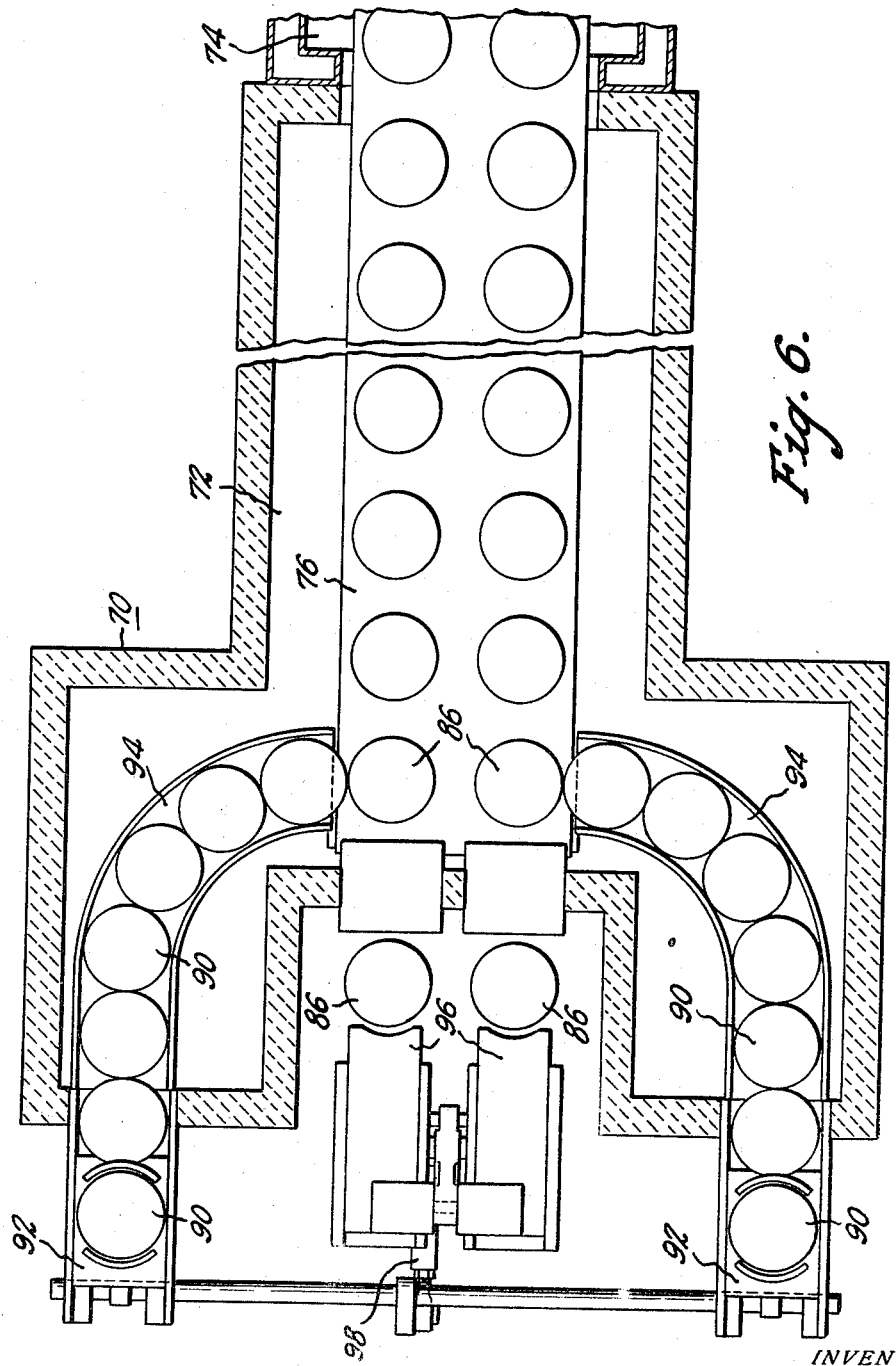

2,350,179

UNITED STATES PATENT OFFICE 2,350,179

METHOD AND APPARATUS FOR MAKING COMPOSITE METAL PARTS

John T. Marvin, Dayton, Ohio, assignor to General Motors Corporation, Detroit, Mich., a corporation of Delaware Application January 16, 1941, Serial No. 374,733

14 Claims. (Cl. 29—33)

This invention relates to the method and apparatus for making composite metal articles and is particularly directed to a method and apparatus for making composite articles which include a porous metal layer wherein the porous metal layer is bonded to a supporting member of steel or the like.

One of the objects of the invention is to provide a method for making composite articles wherein steps are provided for removing oxide coatings on either the porous metal layer or on the steel backing member.

In carrying out the above object it is a further object to provide a method whereby a porous metal layer and a steel supporting member may be heated simultaneously and out of contact with one another under reducing conditions for removing oxide films therefrom after which the porous metal layer may be placed on the steel member and by continued heating bonded thereto. In some cases the porous metal layer may be unsintered at the start of the procedure and thereby may be simultaneously sintered during the treatment.

In carrying out the above objects it is still a further object to provide a method whereby the steps in the method disclosed may be carried out continuously on a plurality of parts or may be carried out continuously on strip material.

It is another object of the invention to provide a method for operating on porous metal layers made from either loose metal powder or from briquetted metal powder which powders may be either presintered or may be sintered during the treatment hereinafter described.

Another object of the invention is to provide a method for compacting the porous metal layer during the bonding step whereby the porosity of the layer is reduced and the bonding is facilitated. In some cases this compacting step may occur after the bonding has taken place and wherein the porosity of the porous metal layer is reduced slightly, or stated differently wherein the porosity of the porous metal layer may be controlled.

Another object of the invention is to provide an apparatus for carrying out the methods herein disclosed which apparatus includes means for compacting the porous metal layer during the sintering thereof.

Further objects and advantages of the present invention will be apparent from the following description, reference being had to the accompanying drawings wherein preferred embodiments of the present invention are clearly shown.

In the drawings:

Fig. 1 is a diagrammatic view showing an apparatus for sintering and simultaneously bonding a loose non-compacted layer of metal powder to the surface of a strip of steel to form a composite article.

Fig. 2 is a fragmentary view showing a portion of the sintering chamber and the cooling chamber together with a modification wherein the pressure rolls are disposed exteriorly of the furnace.

Fig. 3 is a view of another type of apparatus wherein a briquetted powder metal layer is sintered and simultaneously bonded to the surface of the steel strip.

Fig. 4 is a cross sectional view of an apparatus for continuously sintering composite articles wherein pressure is applied to the articles during the sintering thereof.

Fig. 5 is a sectional view taken on the line 5—5 of Fig. 4.

Fig. 6 is a view taken on the line 6—6 of Fig. 4.

Methods for bonding porous metal layers to steel are disclosed in patent numbers, Reissue No. 21,495 issued to Short, as well as Patents No. 2,198,254 and No. 2,198,253, both issued to Koehring. All of these patents are assigned to the assignee of the present invention. In each case the powdered metal or the porous metal, as the case may be, is first applied to the surface of the steel and then the steel with the powdered metal thereon is heated to cause simultaneous sintering and bonding to the porous metal layer. These methods have all proven commercially successful and produce products of commercial value. The present invention is directed to a method for bonding porous metal to steel to produce articles similar to those produced by following the procedures noted in the aforementioned patents but removes or reduces certain difficulties which have arisen in the past. One of these difficulties is caused by the fact that steel, as purchased, in many cases, has oxide films on the surface thereof and to obtain steel without this oxide film premium prices must be paid. Similarly when metal powder is briquetted, for example, bronze or bronze-forming powders and the like, the briquettes are preferably used soon after formation thereof or preferably should be protected from the atmosphere in order to reduce oxidation if the bonding process is to be carried out in the most expeditious fashion. In other words, an oxide film on either the steel or the porous metal layer retards bonding and makes necessary certain adjustments in the process which increases the cost thereof. Obviously, when sintering these objects under reducing conditions considerable oxide film is removed although at the exact points of contact between the steel and the porous metal there is a possibility of some of the unreduced oxide remaining which tends to weaken the bond slightly. Then too, the steel as purchased includes oil films, dirt and dust and other extraneous matter which is not conductive to the formation of a perfect bond. In order to reduce or remove the past difficulties and reduce the cost of the production the present method is proposed wherein the porous metal layer and the steel, or both, are fluxed in effect prior to contact with one another whereby the surfaces of the steel and the porous metal are in condition to yield the strongest bond possible therebetween. In my copending application, Serial No. 272,151, now matured into Patent No. 2,241,094, I disclose the method wherein the steel is first heated to flux the surface thereof and then while in the heated condition powdered metal is dropped thereon in a non-compacted condition and is sintered into a porous metal layer which is simultaneously bonded to the surface of the steel strip. The method herein disclosed may be used in the formation of the composite articles where the powdered metal layer is made from non-compacted metal and may also be used for making composite articles which include a layer of briquetted metal powder thereon. In each and every case the invention resides in the fact that the porous metal layer which may be in the unsintered condition or may have been presintered to a certain extent, or may have been completely sintered, is heated to a temperature approximating the desirable sintering temperature and wherein the steel supporting part is likewise heated to the same temperature which is well below its melting point, said heating being simultaneously arranged and under reducing conditions whereupon oxide films, dirt, grease and other extraneous surface impurities are reduced or removed during this conditioning portion of the treatment whereupon the two layers, namely the porous metal layer and the steel are contacted with one another under continued heating for either bonding the porous metal layer to the steel or for simultaneously completing the sintering of the porous metal layer and bonding it to the steel. In some cases it may be desirable to compact the porous metal layer during the heating treatment, or this compacting step may take place outside of the furnace whichever treatment is the most desirable for the specific case involved.

Porous metal layers may be made from a plurality of metal powders, for example, mixtures of copper and tin powders may be used to form conventional bronzes, likewise mixtures of copper and nickel may be utilized to form finished layers of which include a copper–nickel alloy, or the porous metal layer may be formed from bronze particles which are prealloyed either completely or to an extent wherein the surface thereof is rich in one of the constituents, or the porous metal layer may be formed from copper and antimony, iron and nickel, iron and aluminum, iron and copper, etc. In each and every case a sintering temperature is preferably used which is intermediate the melting points of the constituents that is, above the melting point of the lowest melting constituent but below the melting point of the highest melting constituent. For example, when sintering copper and tin, a temperature of from 1400° F. to 1700° F. is desirable whereas copper and iron mixtures are preferably sintered between 2000° F. and 2150° F. etc. In each case it may also be desirable to include small quantities of graphite, for example from ½ to 6% thereof. If the article is to be used for frictional purposes it may be desirable to include small quantities of silica, alundum, asbestos, to increase the coefficient of friction of the finished article. This comminuted material in either briquetted form or in a loose non-compacted condition may be placed upon supporting elements of steel, steel alloys, iron, iron alloys, copper or the like, but in each case it should be understood that the sintering and bonding temperature must be below the melting point of the supporting element and this temperature to some extent dictates what type of porous metal layer may be bonded to the surface of the supporting element. In most cases the use of steel or alloy thereof is preferable due to its strength and low cost. It may also be desirable in some cases to copper-plate the surface of the steel prior to operations thereon, but this treatment is not entirely necessary and in fact may be eliminated in practicing the present method.

Referring particularly to Fig. 1, an apparatus is shown which includes a sintering furnace 20 having three chambers therein, namely, a pre-sintering chamber 22, a main chamber 24 and a cooling chamber 26. Metal powder 28 contained in a hopper 30 is distributed by the aid of gravity upon the surface of an endless belt and is smoothed out into a substantially uniform non-compacted layer by means of a smoothing device 34. The conveyor 32 is formed from some non-adhering material, such as high chrome steel which is oxidized and thereby does not bond to the powdered metal. This conveyor 32 passes into the chamber 22 wherein the powder metal layer is heated and partially sintered. Upon movement into the chamber 24 the powdered metal layer is sintered together sufficiently to be self-sustaining and passed from the conveyor 32 across a suitable supporting block 34 which may likewise be chrome steel or graphite. Simultaneously with the heating of the porous metal layer, strip material 36, such as steel strip is passed into the furnace from a supply reel 38. The strip is carried over suitable roller conveyors or the like 40 within the furnace. The strip is heated simultaneously with the powdered metal layer but out of contact therewith until it passes the supporting block 34 whereupon the now self-sustaining powdered metal layer is superimposed thereon. Both the steel and porous metal layer are heated to a high temperature approximating the sintering and bonding temperature for the porous metal layer and due to the fact that a reducing atmosphere is maintained within the furnace the surfaces of the two layers are properly conditioned for bonding. Preferably the atmosphere in the furnace is that of an incompletely burned natural gas wherein carbon monoxide and hydrogen are present together with controlled quantities of water vapor. The small quantity of water vapor maintains the chrome steel conveyor in the oxidized condition whereas the atmosphere per se is reducing in nature to the steel strip which preferably does not contain any appreciable quantity of chromium and is likewise reducing in nature to the porous metal. Cracked ammonia, carbon monoxide, hydrogen or any other commercial atmosphere of a reducing nature may be used. After the two strips are superimposed one upon the other, they may pass between a set of rolls 42 which compress the porous metal layer to any desired degree of porosity. The composite strip should remain in the furnace for a sufficient period of time to insure complete sintering and bonding of the porous metal layer to the steel, after which the composite strip passes through the water cooled cooling chamber 26 whence it passes out of the furnace. If desired, pressure rolls 44 may be employed exteriorly of the furnace instead of using roll 42 within the furnace. However, lower pressures may be utilized within the furnace due to the fact that the porous metal layer is in the heated condition thereby facilitating any compacting which is desired. Similarly compacting within the furnace tends to increase the strength of the bond between the porous metal layer and the steel.

Fig. 3 diagrammatically shows another type of sintering apparatus wherein the porous metal layer is briquetted prior to its entry into the furnace. This briquetting step is carried out by means of the apparatus diagrammatically shown at 50 wherein the powdered metal 28 is fed onto the surface of the conveyor 52 and is briquetted thereon by means of rolls 54. This layer after briquetting is a self-sustaining strip designated 56. The exact procedure for accomplishing this end is clearly disclosed in Patent No. 1,930,287 assigned to the assignee of this invention wherein the method and apparatus are shown for producing porous metal strip material in the green or unsintered condition. The strip 56 then passes into a sintering furnace 58 and is supported therein by means of a supporting block 60 formed from chrome steel or graphite. Simultaneously steel strip 36 is passed into the furnace from a reel 38. The action of the atmosphere on strip 56 of the porous metal and strip 36 of the steel is simlar to the action hereinbefore described and after suitable conditioning the two strips are contacted, that is, the porous metal is superimposed upon the steel and cooperating rollers 62 are provided for insuring this contact. The steel strip is supported throughout the furnace on the rollers 40, or other suitable means, and, as noted in connection with Fig. 1, pressure rolls 42 may be provided within the furnace for compacting the porous layer. The furnaces in Figs. 1 and 3 are both heated by any suitable means, preferably electrical heating elements 64. In each case the steel strip may be fed into the furnace by means of pinch rolls, as shown at 66 of Fig. 3, or the reel 38 may be revolved in a suitable manner for forcing the steel strip through the furnace, or the composite strip may be reeled up on a reel (not shown) which draws the composite strip through the furnace. It is apparent that any of these expedients may be used and since all are well known in the art detailed explanation thereof is believed unnecessary.

In order to form a plurality of individual articles rather than the continuous strip the apparatus as shown in Fig. 4 is provided. In this construction, a furnace 70 is utilized which includes a heating chamber 72 and a cooling chamber 74. A roller hearth or continuous conveyor 76 passes through the heating chamber and the cooling chamber and supports any article which may be passed through the furnace. The furnace may be heated electrically or by any other suitable means. Within the furnace is a continuous belt or conveyor 78 which carries a plurality of weights hingedly connected thereto by means of chains 82. A supply device 84 placed exteriorly of the furnace is provided upon which is stacked a plurality of briquettes 86, in the present case such briquettes being shown as circular plates. A second supply device 88 is also provided which carries a plurality of steel plates 90. The steel plates 90 are pushed by means of a pushing device 92 on to a track 94, hence they are discharged upon belt 76. Similarly the porous metal plates 86 are pushed into the furnace by means of a pushing device 96. The pushing devices 92 and 96 are interlocked by means of levers 98, 100 and 102 which are motivated by means of a motor 104 which operates a cam 106 through a speed reducer 108. Thus the supply of porous metal plates and steel plates is synchronized. The porous metal plates are advanced into alignment with the pusher 96 by means of a rack and pinion 110 connected to lever 100 through a lost-motion connection 112 and lever 114. The steel plates 90 are advanced into alignment with pusher 88 by means of gravity. The motor 104 also drives the conveyor 78 whereby the weights 80 are synchronized with the supply of steel plates and porous metal plates. It will be noted from the drawings, that the steel plates are preheated as they pass into the furnace on the track 94, and likewise the briquettes are preheated. As the plates 90 are fed onto the conveyor 76, the porous metal plates are superimposed thereon due to the fact that the level of the porous-metal-plate feed is above the level of the conveyor 76. Thus, as each steel plate 90 is fed onto the conveyor 76, a porous metal plate 86 is superimposed thereon. After traveling a short distance a weight 80 is placed on top of the porous metal plate and is maintained thereon as the composite article comprising the porous metal plate and the steel plate passes through the furnace. As the composite plates are about to enter the cooling chamber, the weights 80 are removed therefrom. The weights 80 may include a graphite facing thereon to prevent sticking or may be formed from chrome steel which is oxidized by the furnace atmosphere. In this manner, the composite articles are sintered and bonded together under pressure within the furnace. Likewise no heat is lost during the treatment since the weights 80 are continuously within the furnace and once they become heated they are not cooled during operation of the device thereby conserving on heat. The entire apparatus is synchronized since it is preferably driven from a single motor 104 and therefore each operation is carried out in synchronism with the next operation so that the steel plates, the porous metal plates and the weights 80 all move in definite steps for producing the results desired. While the drawings show a two-line system it is apparent that either one line or more than two lines may be operated upon in a similar type of apparatus by making obvious mechanical changes thereto. Likewise, it is obvious that the porous metal plates may be previously sintered either completely or partially, if desired, all of these variations coming within the scope of my invention. When the porous plates are previously sintered, a bonding temperature should be chosen at the upper end of the normal sintering range for the ingredients of the plate.

It is also apparent that instead of using pushers and the like that the operation may be carried out by manual manipulation wherein the steel plates may be preheated and fluxed and the porous metal plates may be placed thereon manually or automatically with or without any preheating treatment in which case the steel plates would have the oxides reduced thereon. It is apparent that the porous metal plates may be so formed as to be substantially free from oxide. Likewise, weights 80 may be placed on top of the assembly manually if desired or by other mechanical means.

In each and every case disclosed, it is apparent that the reduction treatment is required in connection with the steel, since it is possible to form the porous metal parts of substantially non-oxidized metal powders. However, under practical conditions it is more expeditious to follow through the treatment as shown since the porous metal layer may be preheated prior to contacting with the steel strip or plate without any additional production cost.

It is manifest that I have provided a method wherein composite metal articles may be economically produced which include a porous metal layer bonded to a steel supporting element wherein the steel supporting element is fluxed and conditioned by means of a reducing atmosphere under elevated temperature conditions prior to the disposition of porous metal layer thereon for forming bonds of high strength between the porous metal and the steel. The present method eliminates mechanical expedients such as washing, sand blasting and/or wire brushing since the oxide films and oil on the steel have been removed within the furnace. In this manner, sintering of a porous metal layer and bonding thereof to a steel support together with fluxing and cleaning the steel and the porous metal may all be accomplished in a single heating operation thereby reducing the cost of the production. It is also apparent that porous layers may be applied to both sides of a steel plate or strip if desired by simultaneous application of the two porous elements by the methods proposed herein.

While the embodiments of the present invention as herein disclosed, constitute preferred forms, it is to be understood that other forms might be adopted, all coming within the scope of the claims which follow.

What is claimed is as follows:

1. The steps in the method of making a composite element including a porous metal portion comprising, briquetting powdered metal into a self-sustaining element in a substantially flat condition, heating a non-porous substantially flat metallic element of higher melting point under reducing conditions for cleaning the surface thereof of any oxides present, and then while continuing heating the non-porous element superimposing the briquetted powdered metal upon the surface of said non-porous element for sintering together the powdered metal into a porous metal portion and simultaneously causing the porous metal layer to bond in situ to the non-porous metal support.

2. The steps in the method of making composite articles including a porous metal layer thereon, comprising, briquetting powdered metal into a self-sustaining porous metal layer, heating a steel support or the like under reducing conditions at a temperature sufficient to reduce any oxides present at the surface thereof, superimposing the briquetted layer of powdered metal upon the steel while continuing the heating and applying pressure to the briquetted layer for at least a portion of the heating period for causing the briquetted layer to sinter together into a porous metal layer which is bonded in situ to the steel support.

3. In a method of making a composite metal article which includes a layer of porous metal and a layer of a stronger relatively less porous metal of higher melting point, said layers being metallurgically bonded together at their contiguous surfaces, the steps comprising: heating two metallic layers of different porosity simultaneously and out of contact with one another at a temperature and for a time sufficient to condition the surface of said layers for bonding, superimposing said heated layers one upon the other, continuing the heating of said superimposed layers for such a time as to effect a metallurgical bond therebetween, continuously surrounding said layers with a reducing atmosphere during all of said aforementioned operations, and then cooling the composite article so formed in a suitable atmosphere.

4. The method as claimed in claim 3 including the added step of compacting the layers during the heating step after the layers have been superimposed and prior to the cooling step.

5. The method as claimed in claim 3 including the added step of compacting the article after the cooling step for controlling the density of the porous metal layer.

6. In the method of making a composite metal article which includes a layer of porous metal and a layer of stronger relatively less porous metal of higher melting point, said layers being metallurgically bonded together at their contiguous surfaces, the steps comprising: providing a compressed layer of metal powder, providing a layer of more dense metal, heating the two layers simultaneously and out of contact with one another at a temperature and for a time sufficient to condition the surfaces of said layers for bonding and for simultaneously partially sintering the metal powder layer, superimposing the partially sintered metal powder layer upon the other layer, continuing the heating of said superimposed layers for such a time as to effect a metallurgical bond therebetween and simultaneously completely sinter the metal powder into a strong porous metal layer, continuously surrounding said layers with a reducing atmosphere during all of said aforementioned operations, and then cooling the composite article so formed in a suitable atmosphere.

7. In a method of making a composite metal article which includes a layer of porous metal and a layer of a stronger relatively less porous metal of higher melting point, said layers being metallurgically bonded together at their contiguous surfaces, the steps comprising: providing a layer of metal powder, providing a layer of more dense metal, heating said two layers simultaneously and out of contact with one another at a temperature for a time sufficient to condition the surfaces of said layers for bonding and for simultaneously partially sintering the metal powder layer, superimposing the said heated layers one upon the other, continuing to heat said superimposed layers for such a time as to effect a metallurgical bond therebetween and simultaneously cause the metal powder layer to be substantially completely sintered for forming a porous metal layer, continuously surrounding said layers with a reducing atmosphere during all of said aforementioned operations, and then cooling the composite article so formed in a suitable atmosphere.

8. The method as claimed in claim 7 including the added step of compacting the porous metal layer during the heating step after the layers have been superimposed and prior to the cooling step for controlling the density thereof.

9. The method as claimed in claim 3 including the added step of compacting the article after the cooling step for controlling the density of the porous metal layer.

10. In the method of continuously forming composite strip material including a steel support having a less dense metal layer bonded thereto, the steps of, providing continually a strip of briquetted powder metal in self-sustaining form, providing continually a strip of steel, heating the two strips progressively and simultaneously while out of contact with one another at a temperature and for a time sufficient to condition the surfaces of the strips for bonding and for simultaneously partially sintering the briquetted metal strip, superimposing the said two heated strips one upon the other, continuing the heating of the superimposed strips for such a time as to effect a metallurgical bond therebetween and simultaneously, substantially completing the sintering of the briquetted powder metal into a porous metal strip, continually surrounding said strips with a reducing atmosphere during all of said aforementioned operations, and then progressively cooling the composite strip so formed in a suitable atmosphere.

11. The method as claimed in claim 10, including the added step of compacting the surface of said porous metal strip during the heating step after the said strips have been superimposed and prior to the cooling step.

12. In the method of continuously forming composite strip material including at least two layers one of which is formed from porous metal and another of which is formed from steel, the steps of, continuously providing a layer of metal powder in strip form, continuously providing a layer of steel in strip form, progressively heating said two layers simultaneously and out of contact with one another at a temperature and for a time sufficient to condition the surfaces of said layers for bonding and simultaneously at least partially sintering the metal powder layer, superimposing said heated layers one upon the other, continuing the heating of said superimposed layers for such a time as to effect a metallurgical bond therebetween and simultaneously substantially completing the sintering of the metal powder layer to form a porous metal layer, continually surrounding the said layers with a reducing atmosphere during all of said aforementioned operations, and then progressively cooling the composite strip so formed in a suitable atmosphere.

13. The method as claimed in claim 12, including the added step of pressing the said layers together during the heating step after the layers have been superimposed and prior to the cooling step.

14. An apparatus for forming a composite material comprising a porous metal layer made from sintered metal powder bonded to the surface of a steel support, comprising in combination, a sintering furnace, means for supplying a metal powder layer to said furnace and for sintering and conveying said layer within said furnace, means for supplying a steel support to said furnace and for heating and conveying said support through said furnace, separating means for maintaining the metal powder layer and the steel support out of contact with one another during the first portion only of their movement through said furnace whereby said metal powder layer after passing said separating means is superimposed upon said steel support, and pressure means disposed within the furnace for compressing the metal powder layer on said steel support.

JOHN T. MARVIN.